US006350526B1

(12) United States Patent
Johnson et al.

(10) Patent No.: US 6,350,526 B1
(45) Date of Patent: Feb. 26, 2002

(54) COATING COMPOSITIONS CONTAINING NON-AQUEOUS DISPERSED POLYMER, A SILANE FUNCTIONAL ACRYLIC POLYMER AND A TRIAZINE

(75) Inventors: Jeffrey W. Johnson, Rochester Hills; Michael D. Fox, Utica, both of MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/509,862

(22) PCT Filed: Oct. 13, 1998

(86) PCT No.: PCT/US98/21523

§ 371 Date: May 19, 2000

§ 102(e) Date: May 19, 2000

(87) PCT Pub. No.: WO99/19411

PCT Pub. Date: Apr. 22, 1999

Related U.S. Application Data

(60) Provisional application No. 60/062,118, filed on Oct. 15, 1997.

(51) Int. Cl.[7] .............................................. B32B 27/30
(52) U.S. Cl. ................... 428/447; 525/100; 525/124; 525/192; 525/222; 525/223; 525/330.5; 526/279; 528/32; 528/45; 252/389.31; 427/387
(58) Field of Search .................. 427/387; 525/100, 525/124, 192, 222, 223, 330.5; 526/279; 528/32, 45; 252/389.31; 428/447

(56) References Cited

U.S. PATENT DOCUMENTS

| | | | |
|---|---|---|---|
| 3,291,763 A | 12/1966 | Becalick et al. | 260/13 |
| 3,328,398 A | 6/1967 | Cousserans et al. | 260/248 |
| 4,372,800 A | 2/1983 | Oizumi et al. | 156/307 |
| 4,873,116 A | 10/1989 | Ancker | 428/36.9 |
| 4,939,213 A | 7/1990 | Jacobs, III et al. | 525/329.9 |
| 4,961,967 A | 10/1990 | Pluddemann | 427/302 |
| 5,013,598 A | 5/1991 | Guerro et al. | 428/283 |
| 5,084,541 A | 1/1992 | Jacobs, III et al. | 528/45 |
| 5,244,959 A | 9/1993 | Hazan et al. | 524/504 |
| 5,288,865 A | 2/1994 | Gupta | 544/200 |
| 5,405,959 A | 4/1995 | Gupta | 544/195 |
| 5,532,027 A | 7/1996 | Nordstrom et al. | 427/493 |
| 5,565,243 A | 10/1996 | Mauer et al. | 427/407.2 |
| 5,929,158 A * | 4/1999 | Matsuno et al. | |
| 5,985,463 A * | 11/1999 | Lin et al. | |
| 6,013,326 A * | 1/2000 | Flosbach et al. | |
| 6,225,400 B1 * | 5/2001 | Bartol et al. | |

FOREIGN PATENT DOCUMENTS

| | | |
|---|---|---|
| DE | 195 29 124 C1 | 11/1996 |
| DE | 195 25 375 A1 | 1/1997 |
| EP | 0 354 510 A2 | 2/1990 |
| EP | 0 541 966 A2 | 5/1993 |
| EP | 0 604 922 A1 | 7/1994 |
| EP | 0 624 577 A1 | 11/1994 |
| WO | WO96/04258 | 2/1996 |
| WO | WO96/25466 | 8/1996 |
| WO | WO96/34905 | 11/1996 |

\* cited by examiner

Primary Examiner—Robert Dawson
Assistant Examiner—Marc S. Zimmer
(74) Attorney, Agent, or Firm—Steven C. Benjamin

(57) ABSTRACT

A coating composition containing about 40–90% by weight of film forming binder and 10–60% by weight of an organic liquid carrier;

wherein the binder contains about (a) about 50–90% by weight of an acrylosilane polymer containing about 30–95% by weight based, based on the weight of the acrylosilane polymer, of polymerized monomers of styrene, alkyl (meth)acrylates having 1–12 carbon atoms in the alkyl group and hydroxy alkyl (meth)acrylates having 1–4 carbon atoms in the alkyl group and any mixtures thereof and 5–70% by weight, based on the weight of the polymer, of polymerized ethylenically unsaturated monomers containing reactive silane groups and the polymer has a weight average molecular weight of about 1,000–30,000;

(b) about 5–25% by weight of a non-aqueous dispersed polymer of
  (i) a macromolecular core having a weight average molecular weight of about 50,000–500,000, and
  (ii) attached to the macromolecular core, a plurality of macromonomer chains having a weight average molecular weight of about 1,000–30,000 of 5–30% by weight, based on the weight of the macromonomer, of polymerized ethylenically unsaturated monomers which having functional groups selected from the following epoxide, anhydride, isocyanate, silane, acid hydroxy, amide or any combination of these groups; and about 70–95% by weight, based on the weight of the macromonomer, of at least one other polymerized ethylenically unsaturated monomer without a crosslinking functionality; and (c) about 5–25% by weight, of a crosslinking agent of tris(alkoxy carbonyl amino) triazine.

8 Claims, No Drawings

COATING COMPOSITIONS CONTAINING NON-AQUEOUS DISPERSED POLYMER, A SILANE FUNCTIONAL ACRYLIC POLYMER AND A TRIAZINE

This application is a 371 of PCT/US98/21523, filed Oct. 13, 1998, which claims benefit of U.S. provisional application Serial No. 60/062,118, filed Oct. 15, 1997.

TECHNICAL FIELD

This invention relates to high solids solvent based coating compositions and in particular to a clear coating composition for clear coat/color coat finishes for automobiles and trucks having improved resistance to etching from acid rain and other environmental pollutants.

BACKGROUND OF THE INVENTION

WO 96/34904 published Nov. 7, 1996 shows a curable coating composition having improved mar and abrasion resistance of polyepoxide and polyacid crosslinking agent, an acrylosilane polymer and an acrylic polyol polymer and a tricarbamoyl triazine compound as a crosslinking agent. The composition can be used as a monocoat over a primer or as a clear coat over a conventional base coat in a base coat clear coat finish. Mauer et at U.S. Pat. No. 5,565,243 issued Oct. 15, 1996 shows a process for applying a base coat plus clear coat finish to substrates such as conventionally used for automobiles and trucks in which the base coat which is pigmented and contains a tricarbamoyl triazine as a crosslinking agent.

There is a need for a coating composition that has improved acid etch resistance and mar and abrasion resistance.

SUMMARY OF THE INVENTION

A coating composition containing about 40–90% by weight of film forming binder and 10–60% by weight of an organic liquid carrier;

wherein the binder contains about
(a) about 50–90% by weight of an acrylosilane polymer containing about 30–95% by weight, based on the weight of the acrylosilane polymer, of polymerized monomers of the group of styrene, alkyl (meth) acrylates having 1–12 carbon atoms in the alkyl group, hydroxy alkyl (meth)acrylates having 1–4 carbon atoms in the alkyl group and any mixtures thereof, and 5–70% by weight, based on the weight of the polymer, of polymerized ethylenically unsaturated monomers containing reactive silane groups and the polymer has a weight average molecular weight of about 1,000–30,000;
(b) about 5–25% by weight of a non-aqueous dispersed polymer having
(i) a macromolecular core having a weight average molecular weight of about 50,000–500,000, and
(ii) attached to the macromolecular core, a plurality of macromonomer chains having a weight average molecular weight of about 1,000–30,000 of 5–30% by weight, based on the weight of the macromonomer, of polymerized ethylenically unsaturated monomers which having functional groups selected from the following epoxide, anhydride, isocyanate, silane, acid hydroxy, amide or any combination of these groups; and about 70–95% by weight, based on the weight of the macromonomer, of at least one other polymerized ethylenically unsaturated monomer without a crosslinking functionality; and
(c) about 5–25% by weight, of a crosslinking agent of tris(alkoxy carbonyl amino) triazine.

DETAILED DESCRIPTION OF THE INVENTION

The novel coating composition of this invention contains a combination of film forming components of an acrylosilane polymer, a non-aqueous dispersed polymer, referred to as a (NAD) polymer, and the crosslinking agent of tris (alkoxy carbonyl amino) triazine that provides improved resistance to acid etching from environmental air pollution and improved mar and abrasion resistance in comparison to conventional coating compositions containing acrylic polymers and melamine crosslinking agents.

Molecular weights are determined by GPC (gel permeation chromatography) using polystyrene as a standard.

The term (meth)acrylate refers to esters of both acrylic and methacrylic acids.

The coating composition of this invention is useful for finishing the exterior of automobile and truck bodies. Depending on its use, the present composition is capable of providing a coating which is durable, has excellent adhesion to basecoats, does not crack, does not deteriorate in terms of transparency under prolonged exposure to weather conditions, and imparts a superior glossy appearance for an extended period. Also, the coating composition offers a significant improvement over conventionally used coating compositions in terms of resistance to etching caused by environmental chemical attack.

A typical steel auto or truck body has several layers of coatings. The steel is typically first coated with an inorganic rust-proofing zinc or iron phosphate layer over which a primer coating is applied which typically is an electrocoated primer or can be a repair primer. A typical electrocoated primer comprises a cathodically deposited epoxy modified resin that is crosslinked with a polyisocyanate. A typical repair primer comprises an alkyd resin. Optionally, a primer surfacer can be applied over the primer coating to provide for better appearance and/or improved adhesion of the basecoat to the primer coat. A pigmented basecoat or colorcoat is next applied over the primer surfacer. A typical basecoat comprises a pigment, which may include metallic flakes in the case of a metallic finish, and polyester or acrylourethane as a film-forming binder. A clear topcoat (clearcoat) is then applied to the pigmented basecoat (colorcoat). The colorcoat and clearcoat are preferably applied to have thickness of about 0.1–3 mils and 1.0–5.0 mils, respectively. A composition of this invention, depending on the presence of pigments or other conventional components, may be used as a basecoat, clearcoat, or primer. However, a particularly preferred composition is useful as a clear topcoat to prevent environmental chemical attack to the entire finish. A clearcoat composition of the present invention may be applied over a basecoat composition of the present invention.

The film-forming portion of the coating composition of this invention, comprising polymeric components, is referred to as the "binder" or "binder solids" and is dissolved, emulsified or otherwise dispersed in an organic solvent or liquid carrier. The binder solids generally include all the normally solid polymeric non-liquid components of the total composition. Generally, catalysts, pigments, and non-polymeric chemical additives such as stabilizers are not considered part of the binder solids. Non-binder solids other than pigments usually do not amount to more than about 5% by weight of the composition. In this disclosure, the term binder includes the acrylosilane polymer, the NAD polymer, tris(alkoxycarbonyl amino) triazine and other crosslinking agents and all other optional film-forming polymers.

The coating composition contains about 40–90% by weight of the binder and about 10–60% by weight of an organic solvent or another liquid carrier. The binder of the coating composition contains about 50–90%, preferably 60–80%, by weight of a film-forming acrylosilane polymer.

The acrylosilane polymer portion of the binder has a weight average molecular weight of about 1,000–30,000, a number average molecular weight of about 500–10,000.

The acrylosilane polymer is the polymerization product of about 30–95%, preferably 50–90%, by weight ethylenically unsaturated non-silane containing monomers and about 5–70%, preferably 10–50% by weight ethylenically unsaturated silane containing monomers, based on the weight of the acrylosilane polymer. Suitable ethylenically unsaturated non-silane containing monomers are alkyl (meth)acrylates, styrene and any mixtures thereof, where the alkyl groups have 1–12 carbon atoms, preferably 3–8 carbon atoms.

Suitable alkyl (meth)acrylate monomers used to form the acrylosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like; methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic (meth)acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl (meth)acrylate and also can be used, for example, such as benzyl acrylate and benzyl methacrylate. Mixtures of the two or more of the above mentioned monomers are also suitable.

In addition to alkyl (meth)acrylates, other non-silane containing polymerizable monomers, up to about 50% by weight of the acrylosilane polymer, can be used for the purpose of achieving the desired properties such as hardness, appearance, mar resistance, and the like. Exemplary of such other monomers are styrene, methyl styrene, acrylamide, acrylonitrile, methacrylonitrile, and the like. Styrene can be used in the range of 0–50% by weight.

The acrylosilane polymer may also comprise hydroxy functional groups which can be provided by hydroxy alkyl (meth)acrylates having 1–4 carbon atoms in the alkyl group such as hydroxy ethyl methacrylate, hydroxy propyl methacrylate, hydroxy butyl methacrylate, hydroxy ethyl acrylate, hydroxy propyl acrylate hydroxy butyl acrylate and the like.

A suitable silane containing monomer useful in forming the acrylosilane polymer is an alkoxysilane having the following structural formula:

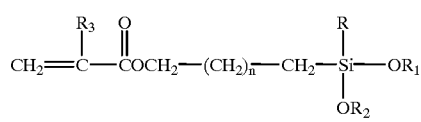

wherein R is either $CH_3$, $CH_3CH_2$, $CH_3O$, or $CH_3CH_2O$; $R_1$ and $R_2$ are $CH_3$ or $CH_3CH_2$; and $R_3$ is either H, $CH_3$, or $CH_3CH_2$; and n is O or a positive integer from 1 to 10. Preferably, R is $CH_3O$ or $CH_3CH_2O$ and n is 1.

Typical examples of such alkoxysilanes are the acrylatoalkoxy silanes, such as gamma-acryloxypropyltrimethoxy silane and the methacrylatoalkoxy silanes, such as gamma-methacryloxypropyltrimethoxy silane, and gamma-methacryloxypropyltris(2-methoxyethoxy) silane.

Other suitable alkoxy silane monomers have the following structural formula:

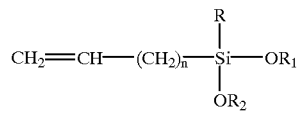

where and R, $R_1$ and $R_2$ are as described above and n is a positive integer from 1 to 10.

Examples of such alkoxysilanes are the vinylalkoxy silanes, such as vinyl trimethoxy silane, vinyl triethoxy silane and vinyl tris(2-methoxyethoxy)silane.

Other suitable silane containing monomers are ethylenically unsaturated acryloxysilanes, including acrylatoxy silane, methacrylatoxy silane and vinylacetoxy silanes, such as vinylmethyldiacetoxy silane, acrylatopropyl triacetoxy silane, and methacrylatopropyltriacetoxy silane. Of course, mixtures of the above-mentioned silane containing monomers are also suitable.

One preferred acrylosilane polymer contains the following constituents: about 10–30% by weight styrene, about 5–15% by weight of ethyl hexyl methacrylate, 40–60% by weight of hydroxy propyl methacrylate and 10–30% by weight of gamma methacryloxy propyl trimethoxy silane.

Silane functional macromonomers also can be used in forming the acrylosilane polymer. These macromonomers are the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxy alkyl (meth)acrylate having 1–4 carbon atoms in the alkyl group and an isocyanato alkyl alkoxysilane such as isocyanato propyl triethoxysilane.

Typical of such above mentioned silane functional macromonomers are those having the following structural formula:

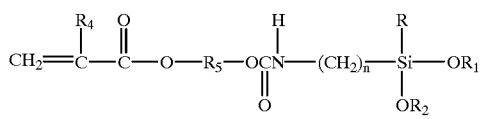

wherein R, $R_1$, and $R_2$ are as described above; $R_4$ is H or $CH_3$, $R_5$ is an alkylene group having 1–8 carbon atoms and n is a positive integer from 1–8.

A non silane containing acrylic polymer can be used in place of the silane containing acrylic polymer or in combination with the silane containing acrylic polymer and provide a coating composition which has adequate properties for some uses where a high level of acid etch resistance is not required. Typical of such an acrylic polymer is an acrylic polymer of polymerized monomers of styrene, alkyl (meth) acrylates having 1–12 carbon atoms in the alkyl group or any mixtures thereof and hydroxy alkyl (meth)acrylates having 1–4 carbon atoms in the alkyl group and the polymer has a hydroxyl number of about 50–200 and a weight average molecular weight of 1,000–200,000 and preferably 1,000–30,000.

In addition to the acrylosilane polymer or acrylic polymer, other film-forming and/or crosslinking solution polymers may be included in the present application. Examples include conventionally known acrylics, cellulosics, aminoplasts, urethanes, polyesters, epoxies or mixtures thereof.

A key component of the coating composition of the this invention is, in addition to the above polymeric components, about 5–25% by weight, based on the weight of the binder, of a non aqueous dispersed polymer (NAD) polymer. The NAD polymer is characterized as a polymer particle dispersed in an organic media, which particle is stabilized by steric stabilization. Steric stabilization is accomplished by the attachment, commonly by adsorption, of a solvated polymeric or oligomeric layer at the particle medium interface. The problem of providing a steric barrier has been considered in two parts: first, the selection of the soluble polymer which comprises the solvate sheath surrounding each particle and, secondly, the method of attaching or anchoring this polymer to the particle surface. Typically the NAD polymers are block or graft copolymers in which one component is the soluble stabilizing portion and the other portion, often termed the anchor, is insoluble in the continuous phase and is adsorbed on or is absorbed into the disperse phase. To increase the stability of the a dispersed polymer, particularly to strong solvents, or to ensure that the stabilizer is not desorbed or displaced, the anchor group may be covalently linked to the particle. This has been achieved by incorporating into the anchor group a reactive group, for example a glycidyl group which can react with a complementary group in the dispersed polymer, for example a carboxylic acid.

In the NAD polymers of this composition, the dispersed phase or particle, sheathed by a steric barrier, will be referred to as the "macromolecular polymer" or "core." The stabilizer forming the steric barrier, attached to this core, will be referred to as the "macromonomer chains" or "arms."

The NAD polymers used in the coating composition of this invention solve the problem of cracking associated with silane coatings. These NAD polymers, reduce cracking and must be used in relatively higher amounts than when used for example, as flow control agents.

The NAD polymer contains about 10–90% by weight, preferably 50–80%, based on the weight of the NAD polymer, of a high molecular weight core having a weight average molecular weight of about 50,000–500,000. The preferred average particle size is 0.1 to 0.5 microns. The arms, attached to the core, make up about 90–10% by weight, preferably 20–50%, of the NAD polymer, and have a weight average molecular weight of about 1,000–30,000, preferably 1000–10,000.

Preferably, the macromolecular core of the NAD polymer is comprised of polymerized ethylenically unsaturated monomers. Suitable monomers include styrene, alkyl acrylate or methacrylate, ethylenically unsaturated monocarboxylic acid, and/or silane containing monomers. Such monomers as methyl methacrylate contribute to a high Tg (transition glass temperature) NAD polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. It is noted that such functional groups as hydroxy can react with silane groups in the acrylosilane polymer to produce more bonding in the composition. If the core is crosslinked, allyl acrylate or allyl methacrylate, which crosslink with each other, can be used or an epoxy functional monomer such as glycidyl acrylate or methacrylate can be used, which can react with a monocarboxylic acid functional ethylenically unsaturated monomer to crosslink the core.

The core can contain silane functionality, for crosslinking purposes, which functionality may be provided by a small amount of one or more of the silane containing monomers mentioned above with respect to the film forming acrylosilane polymer. Suitably, the silane functionality is the primary or major means, preferably the sole means, of crosslinking in the core. Suitably about 2 to 10%, preferably about less than 5% of the monomers making up the macromolecular core are silane monomers capable of crosslinking between themselves. Thus, crosslinking occurs by siloxane bonding (—Si—O—Si—). This silane crosslinking enables the core to behave as a non-crosslinked polymer before cure for good flow during application, resulting in improved appearance. The core can crosslink during and after curing, upon exposure to humidity and heat during curing and/or exposure to humidity in the environment after curing. A further advantage of silane being present in the core is that the cured film does not blush when exposed to humidity, which blushing was found to occur without the presence of silane.

A distinctive feature of the NAD polymers used in this invention is the presence of macromonomer arms which are reactive, that is these arms have numerous reactive groups, referred to a "crosslinking functionalities," which are adapted to react with the acrylosilane polymer of the present composition. It is not known with certainty what portion of the these functional groups do, in fact, react with the acrylosilane polymer, because of the numerous and complicated sets of reactions which may occur during baking and curing of the composition, especially if additional film-forming binders are present. However, it may be said that a substantial portion of these functionalities in the arms, preferably the majority thereof, do in actuality react and crosslink with the film-former of the composition. If additional film-forming polymers are present, for example, a polyol, then the arms may react with film forming polymers other than the acrylosilane polymer. Suitably, about 3 to 30% of the monomers which make up the macromonomer arms have reactive crosslinking functional groups. Preferably about 10 to 20% of the monomers have such reactive groups.

The arms of the NAD polymer should be anchored securely to the macromolecular core. For this reason, the arms preferably are anchored by covalent bonds. The anchoring must be sufficient to hold the arms to the NAD polymer after they react with the film-former polymer.

As indicated above, the arms or macromonomers of the NAD polymer serve to prevent the core from flocculating by forming what is referred to in the art as a steric barrier. The arms, typically in contrast to the macromolecular core, are capable, at least temporarily, of being solvated in the organic solvent carrier or media of the composition. They may therefore be in a chain-extended configuration and their crosslinking functional groups are therefore relatively readily available to reaction with the silane groups of the film forming silane containing polymer. Such arms suitably comprise about 5 to 30% by weight, preferably 10 to 20%, based on the weight of macromonomer, of polymerized ethylenically unsaturated hydroxy, epoxide, silane, acid, anhydride, isocyanate, amide, or other crosslinking functionality containing monomers, or combinations thereof, and about 70–95% by weight, based on the weight of the macromonomer, of at least one other polymerized ethylenically unsaturated monomer without such crosslinking functionality. Preferably the crosslinking functionality is a hydroxy, silane or epoxy containing monomer, since such reactive groups can be utilized in one package systems. When the crosslinking functionality is an acid, anhydride, or isocyanate, then a two package system, with the dispersed polymer in a first package and the acrylosilane in a second package, is generally required. Combinations of the above-mentioned crosslinking functional groups are also suitable, although it is noted that hydroxy and silane groups have limited compatibility and are preferably not on the same macromonomer chain.

As an example, the macromonomer arms attached to the core may contain polymerized monomers of alkyl methacrylate, alkyl acrylate, each having 1–12 carbon atoms in the alkyl group, as well as glycidyl acrylate or glycidyl methacrylate or ethylenically unsaturated monocarboxylic acid containing monomers for anchoring and/or crosslinking. Typically useful hydroxy containing monomers are hydroxy alkyl acrylates or methacrylates as described above.

A preferred composition for the NAD polymer that has hydroxy functionality comprises a core consisting of about 25% by weight hydroxy ethyl acrylate, about 4% by weight methacrylic acid, about 46.5% by weight methyl methacrylate, about 18% by weight methyl acrylate, about 1.5% by weight glycidyl methacrylate and about 5% styrene. The macromonomer attached to the core contains 97.3% by weight prepolymer and about 2.7% by weight glycidyl methacrylate, the latter for crosslinking or anchoring. A preferred prepolymer contains about 28% by weight butyl methacrylate, about 15% by weight ethyl methacrylate, about 30% by weight butyl acrylate, about 10% by weight hydroxyethyl acrylate, about 2% by weight acrylic acid, and about 15% by weight styrene.

The NAD polymer may be produced by conventionally known procedures. For example, it has been disclosed that such polymers may be produced by a process of dispersion free radical polymerization of monomers, in an organic solvent, in the presence of a steric stabilizer for the particles. The procedure has been described as basically one of polymerizing the monomers in an inert solvent in which the monomers are soluble but the resulting polymer is not soluble, in the presence of a dissolved amphiteric stabilizing agent. Such procedures have been extensively disclosed in both the patent and non-patent literature, for example, see the above cited references regarding dispersed polymers in general, or U.S. Pat. No. 4,220,679 and PAINT AND SURFACE COATING: THEORY AND PRACTICE, ed. R. Lambourne (Ellis Horwood Limited 1987). The macromonomer arms can be prepared by cobalt catalyzed special chain transfer (SCT) polymerization, group transfer polymerization (GTP), or free radical polymerization.

The coating composition of this invention contains about 5–25% by weight, based on the weight of the binder, of a crosslinking agent of tris(alkoxy carbonyl amino) triazine. One particularly preferred crosslinking agent is methoxy/butoxy carbonyl amino 1,3,5 triazine.

Optionally, blends of tris(alkoxy carbonyl amino) triazine and an alkylated melamine formaldehyde crosslinking agent can be used. Typically, the blend can contain up to 80% by weight of the alkylated melamine formaldehyde crosslinking agent. The range of constituents in the blend can be 20–100% tris(alkoxy carbonyl amino) triazine and correspondingly 80–0% of the alkylated melamine formaldehyde crosslinking agent. agent.

Typical alkylated melamine formaldehyde crosslinking agents that can be used are, for example, conventional monomeric or polymeric alkylated melamine formaldehyde resin that are partially or fully alkylated. One useful crosslinking agent is a methylated and butylated or isobutylated melamine formaldehyde resin that has a degree of polymerization of about 1–3. Generally, this melamine formaldehyde resin contains about 50% butylated groups or isobutylated groups and 50% methylated groups. Such crosslinking agents typically have a number average molecular weight of about 300–600 and a weight average molecular weight of about 500–1500. Examples of commercially available resins are "Cymel" 1168, "Cymel" 1161, "Cymel" 1158, "Resimine" 4514 and "Resimine" 354. Other crosslinking agents that can be use in the blend are urea formaldehyde, benzoquanamine formaldehyde and blocked polyisocyanates.

A catalyst is typically added to catalyze the crosslinking of the silane moieties of the silane polymer with itself and with other components of the composition, including the dispersed polymer. Typical of such catalysts are dibutyl tin dilaurate, dibutyl tin diacetate, dibutyl tin dioxide, dibutyl tin dioctoate, tin octoate, aluminum titanate, aluminum chelates, zirconium chelate and the like. Tertiary amines and acids or combinations thereof are also useful for catalyzing silane bonding. Preferably, these catalysts are used in the amount of about 0.1 to 5.0% by weight of the composition.

In addition, the coating composition may include a structured polymer, a STAR polymer, or a solvent reversible polymer (SRP).

To improve weatherability of a clear finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

The composition may also include other conventional formulation additives such as flow control agents, for example, such as Resiflow S (polybutylacrylate), BYK 320 and 325 (high molecular weight polyacrylates); rheology control agents, such as fumed silica; water scavengers such as tetrasilicate, trimethyl orthoformate, triethyl orthoformate and the like.

When the present composition is used as a clearcoat (topcoat) over a pigmented colorcoat (basecoat) to provide a colorcoat/clearcoat finish, small amounts of pigment can be added to the clear coat to eliminate undesirable color in the finish such as yellowing.

The present composition also can be pigmented and used as the colorcoat, or as a monocoat or even as a primer or primer surfacer. The composition has excellent adhesion to a variety of substrates, such as previously painted substrates, cold rolled steel, phosphatized steel, and steel coated with conventional primers by electrodeposition. The present composition exhibits excellent adhesion to primers, for example, those that comprise crosslinked epoxy polyester and various epoxy resins, as well as alkyd resin repair primers. The present composition can be used to coat plastic substrates such as polyester reinforced fiberglass, reaction injection-molded urethanes and partially crystalline polyamides.

When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition.

Conventional solvents and diluents are used to disperse and/or dilute the above mentioned polymers to obtain the present coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naphtha, mineral spirits, heptane and other aliphatic, cycloaliphatic, aromatic hydrocarbons, esters, ethers and ketones and the like.

The coating composition can be applied by conventional techniques such as spraying, electrostatic spraying, dipping, brushing, flowcoating and the like. The preferred techniques are spraying and electrostatic spraying. After application, the composition is typically baked at 100–150° C. for about 15–30 minutes to form a coating about 0.1–3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

Upon curing of clear topcoat compositions of the present invention, a portion of the silane containing polymer may migrates and stratifies to the top of the clearcoat, particularly when the acrylosilane polymer is used so as to produce a durable, weather-resistant clearcoat. Such stratification has been shown by electron scanning chemical analysis (ESCA) of a cross section of the cured layer of topcoat.

The coating composition can be formulated as a one-package system that has an extended shelf life.

The following Examples illustrate the invention. All parts and percentages are on a weight basis unless otherwise indicated. All molecular weights disclosed herein are determined by GPC using a polystyrene standard.

EXAMPLE 1

Preparation of Polymer Solution 1

The following constituents were charged into a polymerization vessel equipped with a heating mantel, a reflux condenser, a stirrer, thermometer, a nitrogen inlet and an addition funnel:

|  | Parts by Weight |
|---|---|
| Portion 1 | |
| 1-Pentanol | 141.4 |
| n-Pentyl; propionate | 175.4 |
| Portion 2 | |
| Styrene monomer (S) | 230.8 |
| 2-Ethyl hexyl methacrylate (2EHMA) | 115.5 |
| Hydroxy propyl methacrylate (HPMA) | 577.1 |
| Gamma-methacryloxy propyl trimethoxy silane (MPTS) | 230.8 |
| Portion 3 | |
| Vazo 67 [2.2(2-methyl butane nitrile)] | 91.9 |
| n-Propyl propionate | 176.6 |
| Total | 1739.4 |

Portion 1 was charged into the polymerization vessel and heated to its reflux temperature under nitrogen. Portion 2 was then added over a 330 minute period while maintaining the reaction mixture at its reflux temperature. Portion 3 was then added and the reaction mixture was held at its reflux temperature for an additional 30 minutes.

The resulting polymer solution had a weight solids of 67.9%, the polymer had a number average molecular weight of about 1,900 and a weight average molecular weight of about 6,000 and contains the following constituents S/2EHMA/HPMA/MPTS in a ratio of 20/10/50/20.

Preparation of a NAD (Non-aqueous Dispersion)

A hydroxy functional NAD polymer dispersion was prepared by charging the following constituents into a reactor equipped as above:

|  | Parts by Weight |
|---|---|
| Portion 1 | |
| Isopropanol | 179.26 |
| Acrylic polymer solution (52% solids of an acrylic polymer of 15% styrene, 28% butyl methacrylate, 30% butyl acrylate, 10% hydroxy ethyl acrylate, 2% acrylic acid and 15% ethyl methacrylate having a weight average molecular weight of 10,000 in a solvent mixture of 82.2% xylene and 17.8% butanol) | 2254.05 |
| Mineral spirits | 255.65 |
| Heptane | 1912.46 |
| Portion 2 | |
| Heptane | 28.75 |
| t-Butyl peroctoate | 4.68 |
| Portion 3 | |
| Methyl methacrylate monomer (MMA) | 1459.69 |
| Hydroxy ethyl acrylate monomer (HEA) | 784.81 |
| Styrene monomer (S) | 156.97 |
| Portion 4 | |
| Acrylic polymer solution (described above) | 1126.52 |
| Methyl methacrylate monomer | 125.57 |
| Methyl acrylate monomer | 565.06 |

-continued

| | Parts by Weight |
|---|---|
| Glycidyl methacrylate monomer | 47.05 |
| Heptane | 17.25 |
| Portion 5 | |
| Mineral spirits | 638.63 |
| t-Butyl peroctoate | 47.14 |
| Isobutanol | 127.31 |
| Portion 6 | |
| t-Butyl peroctoate | 30.96 |
| Isobutnaol | 255.65 |
| Portion 7 | |
| Heptane | 167.25 |
| Total | 10,184.71 |

Portion 1 was charged into the reaction vessel and heated to its reflux temperature. Then Portion 2 was added to the reaction vessel mixed and held at reflux temperature for 2 minutes. Then Portions 3 and 4 were added simultaneously with Portion 5, over a 210 minute period, to the reaction vessel while maintaining the resulting reaction mixture at its reflux temperature. Then the mixture was held at its reflux temperature for an additional 45 minutes. Portion 6 was added over a 90 minute period while maintaining the reaction mixture at its reflux temperature and then held at this temperature for an additional 90 minutes. Portion 7 was added and excess solvent is stripped off to give a 60% solids dispersion.

The resulting NAD polymer has a core having a weight average molecular weight of about 100,000–200,000 and arms attached to the core having a weight average molecular weight of about 10,000–15,000.

CLEAR COAT COMPOSITION-1

The following constituents were charged into a mixing vessel and blended together to form a clear coating composition:

| | Parts by Weight |
|---|---|
| Portion 1 | |
| NAD dispersion (prepared above in Example 1) | 22.90 |
| Portion 2 | |
| "Tinuvin" 123 U. V. Light absorber | 0.90 |
| "Tinuvin" 900 - 2-[2-hydroxy-3,5-di(1,1-dimethyl(benzyl)phenyl]-2H-benzotriazole | 1.00 |
| "Tinuvin" 1130 (reaction product of b-3-(2H-benzotriazole(2-yl)-4-hydroxy-5-tert-butyl phenyl propionic acid methyl ester and propylene glycol 300) | 0.45 |
| Portion 3 | |
| Butanol | 6.00 |
| D.C. 57 solution (10% solids of dimethyl siloxane in solvent) | 0.05 |
| Fumed silica dispersion | 6.67 |
| Nacure 5543 (25% solids of dodecyl dibutyl sulfonic acid, diisoporpanol amine blocked in methanol) | 2.88 |

-continued

| | Parts by Weight |
|---|---|
| TACT solution (50% solids in butanol of methoxy/butoxy carbonylamino 1,3,5 triazine) | 23.67 |
| Polymer Solution 1 (prepared above) | 41.82 |
| Total | 111.02 |

Portion 1 was charged into a mixing vessel and Portion 2 was premixed and ten added to Portion 1 with mixing and then Portion 3 was added with mixing to form a coating composition.

Phosphated steel panels that have been electrocoated with an electrocoating primer composition were sprayed coated with a conventional waterborne base coating composition that was prebaked for 5 minutes at about 83° C. to form a basecoat about 0.5–1.0 mil thick The above prepared Clear Coating Composition 1 was sprayed applied to the basecoat of the panels and then the panels were fully cured by baking for 30 minutes at about 140° C. and had an excellent appearance.

Clear Coating Composition A was prepared which is identical to Clear Coating Composition 1 except the TACT solution was replaced with a "Cymel" 1168 solution which is a 50% solution of a monomeric fully isobutylated/methylated melamine that is conventionally used in coating compositions. Phosphated and electrocoated steel panels as described above where spray coated with a conventional waterborne base coating composition and prebaked as described above and then Clear Coating Composition A was applied and the panels fully cured by baking as described above. The panels had an excellent appearance.

The panels coated with Composition 1 and the panels coated with Composition A were compared side by side in an acid etch test. In this test, the panels are placed on a Byk gradient bar oven, 8 spots of acid are place on each panel and the temperature of the panel is increased in 2.77 degree C. from 10 to 30 degrees C. Damage caused by acid etch is rated from 0–10 where 0 indicates no etching and 10 indicates severe acid etching. A cumulative rating is then determined for each panel. Composition 1 (the invention containing TACT) gave 50 units better acid etch resistance than did Composition A which contained a conventional alkylated melamine instead of TACT.

EXAMPLE 2

Preparation of Polymer Solution 2

The following constituents were charged into a polymerization vessel equipped with a heating mantel, a reflux condenser, a stirrer, thermometer, a nitrogen inlet and an addition funnel:

| | Parts by Weight |
|---|---|
| Portion 1 | |
| 1-Pentanol | 141.4 |
| n-Pentyl; propionate | 175.4 |
| Portion 2 | |
| Styrene monomer (S) | 288.5 |
| 2-Ethyl hexyl methacrylate (2EHMA) | 288.5 |
| Hydroxy propyl methacrylate (HPMA) | 577.1 |

-continued

| | Parts by Weight |
|---|---|
| Portion 3 | |
| Vazo 67 (described in Example 1) | 91.9 |
| n-Propyl propionate | 176.6 |
| Total | 1739.4 |

Portion 1 was charged into the polymerization vessel and heated to its reflux temperature under nitrogen. Portion 2 was then added over a 330 minute period while maintaining the reaction mixture at its reflux temperature. Portion 3 was then added and the reaction mixture was held at its reflux temperature for an additional 30 minutes.

The resulting polymer solution had a % weight solids of 67.9, the polymer had a number average molecular weight of about 1,900 and a weight average molecular weight of about 6,000 and contains the following constituents S/2EHMA/HPMA in a ratio of 25/25/50.

CLEAR COAT COMPOSITION-2

The following constituents were charged into a mixing vessel and blended together to form a clear coating composition:

| | Parts by Weight |
|---|---|
| Portion 1 | |
| NAD dispersion (prepared above) | 22.90 |
| Portion 2 | |
| "Tinuvin" 123 (described in Example 1) | 0.90 |
| "Tinuvin" 900 - 2-[2-hydroxy-3,5-di(1,1-dimethyl(benzyl)phenyl]-2H-benzotriazole | 1.00 |
| "Tinuvin" 1130 (reaction product of b-3-(2H-benzotriazole(2-yl)-4-hydroxy-5-tert-butyl phenyl propionic acid methyl ester and propylene glycol 300) | 0.45 |
| Portion 3 | |
| Butanol | 6.00 |
| D.C. 57 solution (10% solids of dimethyl siloxane in solvent) | 0.05 |
| Fumed silica dispersion | 6.67 |
| Nacure 5543 (25% solids of dodecyl dibutyl sulfonic acid, diisoporpanol amine blocked in methanol) | 2.88 |
| TACT solution (50% solids in butanol of methoxy/butoxy carbonylamino 1,3,5 triazine) | 23.67 |
| Polymer Solution 2 (prepared above) | 41.82 |
| Total | 111.02 |

Portion 1 was charged into a mixing vessel and Portion 2 was premixed and ten added to Portion 1 with mixing and then Portion 3 was added with mixing to form a coating composition.

Phosphated steel panels that have been electrocoated with an electrocoating primer composition were sprayed coated with a conventional waterborne base coating composition that was prebaked for 5 minutes at about 83° C. to form a basecoat about 0.5–1.0 mil thick The above prepared Clear Coating Composition 2 was sprayed applied to the basecoat of the panels and then the panels were fully cured by baking for 30 minutes at about 140° C. and had an excellent appearance.

Clear Coating Composition A (prepared in Example 1) was compared to Composition 2 for acid etch resistance. It is well known that acrylosilane containing composition have better acid etch resistance than non-silane containing acrylic polymers and therefore this composition was used instead of replacing TACT in Composition 2 with the alkylated melamine. Composition 2 was applied to the same type of phosphated, electrocoated primer and coated with a waterborne base coat as above and the panels fully cured by baking as described above. The panels had an excellent appearance.

As in Example 1 the panels coated with Composition 2 and the panels coated with Composition A were compared side by side in the acid etch test described in Example 1. A cumulative rating was determined for each panel. Composition 2 (the invention containing TACT) gave 30 units better acid etch resistance than did Composition A which contained a the acrylosilane instead of the acrylic resin without silane and the conventional alkylated melamine instead of TACT. This is surprising and unexpected that Composition 2 which did not contain an acrylosilane had a significant improvement in acid etch resistance. The use of TACT Composition 2 gave a superior acid etch resistant coating.

Various modifications, alterations, additions or substitutions of the components of the compositions of this invention will be apparent to those skilled in the art without departing from the scope and spirit of this invention. This invention is not limited to the illustrative embodiments set forth herein, but rather the invention is defined by the following claims.

We claim:

1. A coating composition comprising about 40–90% by weight of film forming binder and 10–60% by weight of an organic liquid carrier; wherein the binder comprises about
    (a) about 50–90% by weight of an acrylosilane polymer consisting essentially of about 30–95% by weight, based on the weight of the acrylosilane polymer, of polymerized monomers of hydroxy alkyl (meth) acrylates having 1–4 carbon atoms in the alkyl group and polymerized monomers selected from the group consisting of styrene, alkyl (meth)acrylates having 1–12 carbon atoms in the alkyl group, and any mixtures thereof and 5–70% by weight, based on the weight of the polymer, of polymerized ethylenically unsaturated monomers containing reactive silane groups and the polymer having a weight average molecular weight of about 1,000–30,000;
    (b) about 5–25% by weight of a non-aqueous dispersed polymer of
        (i) a macromolecular core having a weight average molecular weight of about 50,000–500,000, and
        (ii) attached to the macromolecular core, a plurality of macromonomer chains having a weight average molecular weight of about 1,000–30,000 of 5–30% by weight, based on the weight of the macromonomer, of polymerized ethylenically unsaturated monomers which having functional groups selected from the group consisting of epoxide, anhydride, isocyanate, silane, acid hydroxy, amide or any combination of these groups; and about 70–95% by weight, based on the weight of the macromonomer, of at least one other polymerized ethylenically unsaturated monomer without a crosslinking functionality; and
    (c) about 5–25% by weight, of a crosslinking agent consisting of tris(alkoxy carbonyl amino) triazine.

2. The coating composition of claim 1 in which the ethylenically unsaturated monomer containing reactive silane groups has the following structural formula:

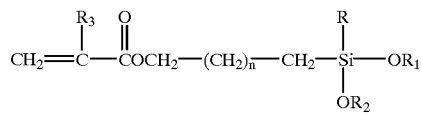

wherein R is either $CH_3$, $CH_3CH_2$, $CH_3O$, or $CH_3CH_2O$; $R_1$ and $R_2$ are $CH_3$ or $CH_3CH_2$; and $R_3$ is either H, $CH_3$, or $CH_3CH_2$; and n is 0 or a positive integer from 1 to 10.

3. The coating composition of claim 1 in which the acrylosilane polymer consists of polymerized monomers of about 10–30% by weight styrene, 5–15% by weight of ethyl hexyl acrylate, 40–60% by weight of hydroxy propyl methacrylate and 10–30% by weight of gamma methacryloxy propyl trimethoxy silane.

4. The coating composition of claim 1 in which the crosslinking agent contains up to 80% by weight, based on the weight of the crosslinking agent, of an alkylated melamine crosslinking agent having 1–4 carbon atoms in the alkylated group.

5. A substrate coated with a dried cured layer of the coating composition of claim 1.

6. A coating composition comprising about 40–90% by weight of film forming binder and 10–60% by weight of an organic liquid carrier; wherein the binder comprises about
 (a) about 50–90% by weight of an acrylic polymer consisting essentially of polymerized monomers of hydroxy alkyl (meth)acrylates having 1–4 carbon atoms in the alkyl group and polymerized monomers selected from the group consisting of styrene, alkyl (meth)acrylates having 1–12 carbon atoms in the alkyl group, and any mixtures thereof and the polymer having a weight average molecular weight of about 1,000–30,000;
 (b) about 5–25% by weight of a non-aqueous dispersed polymer of
  (i) a macromolecular core having a weight average molecular weight of about 50,000–500,000, and
  (ii) attached to the macromolecular core, a plurality of macromonomer chains having a weight average molecular weight of about 1,000–30,000 of 5–30% by weight, based on the weight of the macromonomer, of polymerized ethylenically unsaturated monomers which having functional groups selected from the following epoxide, anhydride, isocyanate, silane, acid hydroxy, amide or any combination of these groups; and about 70–95% by weight, based on the weight of the macromonomer, of at least one other polymerized ethylenically unsaturated monomer without a crosslinking functionality; and
 (c) about 5–25% by weight, of tris(alkoxy carbonyl amino) triazine.

7. A process for coating a substrate, comprising the steps of:
 (a) applying a layer of a pigmented basecoating to the substrate to form a basecoat thereon;
 (b) applying to the basecoat a layer of the composition of claim 1 to form a top coat over said basecoat;
 (c) curing the basecoat and topcoat to form a basecoat and topcoat on the substrate.

8. A substrate coated with a pigmented basecoat of a film forming polymer and a pigment, and a clearcoat comprising the composition of claim 1 in superimposed adherence to the basecoat.

* * * * *